United States Patent [19]
Perry

[11] 3,909,217
[45] Sept. 30, 1975

[54] ABRASIVE COMPOSITION CONTAINING A GEL AND A BORON-DIALKYL SILICON-OXYGEN POLYMER

[75] Inventor: Kenneth E. Perry, Wellesley, Mass.

[73] Assignee: Winfield Brooks Company, Inc., Woburn, Mass.

[22] Filed: Dec. 13, 1973

[21] Appl. No.: 424,588

Related U.S. Application Data

[63] Continuation of Ser. No. 202,621, Nov. 26, 1971, abandoned.

[52] U.S. Cl. ................. 51/298; 51/306; 51/317
[51] Int. Cl.$^2$ .................. C08J 5/14; C09K 3/14
[58] Field of Search ............ 51/298, 306, 317, 2

[56] References Cited
UNITED STATES PATENTS

| | | | |
|---|---|---|---|
| 2,497,021 | 2/1950 | Sterns | 51/317 |
| 3,496,677 | 2/1970 | Bodine | 51/317 |
| 3,521,412 | 7/1970 | McCarty | 51/299 |
| 3,634,973 | 1/1972 | McCarty | 51/317 |

*Primary Examiner*—Donald J. Arnold
*Attorney, Agent, or Firm*—Sewall P. Bronstein

[57] ABSTRACT

A flowable abrasive composition comprising a polyboronorgano silicon compound and dispersed abrasive granules, said composition being modified with a gel formed from a metallic soap (8–22 carbon atoms) and a hydrocarbon oil. The composition is especially useful for honing, abrading, deburring or polishing surfaces, especially metallic surfaces.

9 Claims, No Drawings

3,909,217

ABRASIVE COMPOSITION CONTAINING A YEL AND A BORON-DIALKYL SILICON-OXYGEN POLYMER

This is a continuation of application Ser. No. 202,621, filed on Nov. 26, 1971, and now abandoned.

INTRODUCTION

The invention relates to a flowable, abrasive composition comprising a viscous carrier laden with abrasive granules for honing, abrading, deburring a surface, especially by reciprocating said composition along the surface under pressure and at varying velocities.

A problem with abrasive compositions made up of a viscous carrier laden with abrasive particles when forced back and forth under pressure and at a high velocities along a surface to be treated has been that with use under such pressure and velocities, the heat of friction causes breakdown of the composition to a point where it loses its efficiency. Consequently, there is a continued search for improved flowable abrasive compositions.

STATEMENT OF THE INVENTION

The subject invention provides a flowable abrasive composition for honing, abrading, deburring or polishing the surfaces of an object which composition has a desired consistency prior to use and has the valuable advantages of substantially retaining its consistency and effectiveness during use, even under conditions of pressure and velocity and the associated high temperatures due to friction. The composition comprises a polyboronorgano silicon (the polymer) compound loaded with abrasive granules and modified with a substantially water-insoluble gel formed from a metallic soap (8–22 carbon atoms) and a hydrocarbon oil. The composition may be further modified by the addition of small quantities of couplers and/or lubricants as is known in the art, if desired. The composition is in part characterized by the gel which creates and maintains the desired consistency of the composition.

DESCRIPTION OF THE PREFERRED EMBODIMENTS

The polymer alone loaded with abrasive granules is not entirely satisfactory for honing the internal surfaces of a passage-way, but when modified with the gel of the metal soap and the hydrocarbon oil, is soft and readily flowable and has a consistency varying between a paste and a biscuit dough during the mixing thereof and during use. The composition possesses various degrees of inner lubricity with very little, if any, resilience and bounce when dropped with or without abrasive. The polymer, modified with the gel does not appreciably increase in hardness or decrease in flowability under static pressure.

The gel used to modify the polymer is known in the art and formed by reaction of a metal soap with a hydrocarbon oil. In the prior art, it is used for such diverse applications as thickeners for paint, inks, resinous specialty coatings, plastisols, concrete curing compounds and many other bodying or viscosity improving applications.

The metallic soap component of the gel, as is known in the art, is a salt, preferably substantially water insoluble of a fatty carboxylic acid usually having from 8 to 22 carbon atoms, typical examples including aluminum, beryllium, cadmium, calcium, lithium, magnesium and zinc salts of acids such as lauric acid, stearic acid, oleic acid, linoleic acid, linolenic acid, palmatic acid, behenic acid and mixtures thereof. Frequently, these salts of fatty acids or metallic soaps is by common useage referred to as metallic stearates which term includes not only the insoluble metallic salts of stearic acid cut also a wide variety of other high-molecular weight organic acids as well. the aluminum salts are preferred as they form the most stable gels and those materials known in the art as aluminum stearates are most preferred.

The hydrocarbon oil, preferably an aliphatic oil, used as the second component in the formation of the gel is preferably one of the parafinic oils, but may be any of the other hydrocarbon oils known to form gels with metallic soaps such as one of the naphthenic oils.

The gel is formed by mixing from 1 to 35% by weight, preferably from 3 to 15% of the metallic soap with the hydrocarbon oil together and heating the mixture to a temperature in excess of the gelation temperature, preferably to between 10° and 20°F in excess of the gelation temperature, and holding at this temperature for a period of at least 15 minutes.

The polymer is made by reacting a silicone oil, e.g., polydimethylsiloxane with a boron compound, e.g., pyrroboric acid, boric acid anhydride and others in the presence of a catalyst, i.e., a Lewis acid catalyst, with heat and agitation followed by treatment with ammonium carbonate or ammonia to neutralize any residual Lewis acid catalyst.

The abrasive component of the composition or grit is of any conventional abrasive materials used in such honing formulations, i.e., silicon carbide, alumina, boron carbide and the like. The size of the grit may vary over a wide range depending on the job to be done and the physical properties desired in the composition. Thus, the size may vary from 20 mesh to 600 mesh, and in some cases, it may be as low as 2 to 5 microns. It has been found that even larger abrasive sizes are employed for heavier work, substantially better results are achieved by using finer abrasive sizes in combination with the larger particles.

The amount of abrasive relative to the remainder of the composition (gel and the polymer) is at least 25% by weight of the total composition, preferably varies between 50 and 300% by weight of the composition and most preferably varies between 100 and 190% by weight of the composition.

To provide the flowable abrasive composition in accordance with the invention, the polymer is thoroughly kneaded together with the gel modifier until it is honogeneous and has the desired ductility, softness, flowability and viscosity. The grit or abrasive is then thoroughly and intimately mixed with the composition with stirring to provide a composition ready for use.

The amount of gel added to the polymer is dependent upon the properties of the gel and the consistency desired in the final composition. This is in turn is dependent upon the use of the abrasive composition. For example, in abrading a relatively small opening-i.e., ⅛ inch in diameter and smaller, conditions of relatively high pressure and velocity are encountered and a relatively free-flowing abrasive composition having a paste-like consistency is desirable. This can be accomplished with a relatively soft gel (such as one formed from the aluminum stearate and a parafinic oil) in medium concentration or with a stiffer gel (such as one formed from aluminum stearate and a naphthenic oil) in lower concentration. Alternatively, where the abrasive composition is to be used for abrading the interior of a relatively large passageway where pressure and velocity are relatively low, then a stiffer abrasive composition having a consistency of a biscuit dough is desirable. This is accomplished by use of a stiff gel in adequate concentration. In general, with the foregoing as a guideline, the ratio of the gel to the polymer may vary between 1 to 4 and 4 to 1, preferably varies between 1 to 2 and 2 to 1 and most preferably is about 1 to 1.

The flowable abrasive composition in accordance with the invention has the following advantages as a carrier for abrasive particles in comparison to compositions of the prior art:

1. The pressure required to achieve adequately high velocities through the restriction or restrictions formed in part or in whole by the worked-on-surface of the work piece by virtue of pressure drop are relatively small, i.e., less than 500 psi.

2. The gentleness or harshness of the work performed as well as the pressure required can be varied widely by varying the amount and kind of gel and grit to control viscosity, ductility, softness and lubricity.

3. The grit does not settle even when present in large amounts.

4. The composition is quite stable to degradation and hence, has a long shelf life.

5. Although it is not hygroscopic, the composition can be easily dispersed in water and detergent to facilitate cleanup.

6. The abrasive composition does not stick to the workpiece or the apparatus and hence can be easily removed therefrom.

The invention will be more specifically illustrated by the following examples.

EXAMPLE 1

A polymer was formed from 50 pounds of a dimethyl silicone oil, ½ pound of $FeCl_3 \cdot 6H_2O$ (Lewis acid catalyst) and 3 pounds of pyroboric acid by reaction at a temperature of 200°–250°C with agitation to form a highly viscous boron-organo silicon heteropolymer. This was reacted with 1½ pounds of $NH_4CO_3$ to neutralize any acid residue. The resulting material was somewhat brittle, stiff and crumbly.

A gel was formed by adding 3.6 pounds of aluminum stearate (No. 801, S. B. Penich and Co.) to 60 pounds of hydrocarbon oil (Drakol 9, Pennsylvania Refining Co.) at room temperature with stirring. The mixture was then heated to the gelation temperature of 194°F, heated further to 240°F and held at that temperature for 15 minutes to form a relatively thick gel.

Twenty pounds of the polymer were mixed with 30 pounds of the gel at a temperature of 215°F. After thorough mixing, the mixture was cooled and kneaded until it was homogeneous.

Thereafter, 75 pounds of silicon carbide abrasive particles having an average particle size of 220 mesh were mixed with the polymer composition. At this point, the mixture had a pastelike consistency.

The resulting abrasive mixture was then pumped at a pressure of 450 psi back and forth 10 times through the ⅛ inch holes of test washers made of steel, the pressure drop through these holes causing the mixture to squirt through the holes at an extremely high velocity.

The resultant action was complete removal of burrs from the edges of the hole and excellent surface finish on the wall of the hole.

EXAMPLE 2

Same as example 1, except that the aluminum stearate was replaced with zinc stearate and a gelation temperature of 194°F was used. Equally good results were obtained.

EXAMPLE 3

Same as example 1, except that the naphthenic oil (Audobon 50, Getty Oil Co.) was substituted for the hydrocarbon oil of example 1 with similarly good results. This mix was more dough like in consistency.

The aforesaid examples and description have been given for purposes of illustration only and it is not intended that the invention be limited thereto, but only to the compositions claimed in the following claims and their equivalent.

I claim:

1. An abrasive composition comprising (1) a boron-dialkyl silicon-oxygen polymer, (2) a gel formed from a metallic soap of a fatty carboxylic acid having 8 to 22 carbon atoms and a hydrocarbon oil and (3) abrasive grit particles dispersed in said composition.

2. The composition of claim 1 wherein the ratio of the gel to the polymer varies between 1 to 4 to 4 to 1.

3. The composition of claim 1 where the ratio of the gel to the polymer varies between 1 to 2 and 2 to 1.

4. The composition of claim 1 where the ratio of the gel to the polymer is about 1 to 1.

5. The composition of claim 1 where the metallic soap is of a metal selected from the group of aluminum, beryllium, cadmium, calcium, lithium, magnesium and zinc and the acid is of the group lauric acid, stearic acid, oleic acid, linoleic acid, linolenic acid, palmitic acid, behenic acid and mixtures thereof.

6. The composition of claim 5, wherein the metal is aluminum.

7. The composition of claim 5 where the metal soap is an aluminum stearate.

8. The composition of claim 5, said dialkyl comprising dimethyl.

9. An abrasive composition comprising (1) a reaction product of a dialkyl silicone and a boron compound selected from the group consisting of a boric acid and a boric acid anhydride, (2) a gel formed from a metallic soap of a fatty carboxylic acid having 8 to 22 carbon atoms and a hydrocarbon oil and (3) abrasive grit particles dispersed in said composition.

* * * * *